Patented Dec. 14, 1948

2,456,367

UNITED STATES PATENT OFFICE 2,456,367

CALCIUM-NICKEL PHOSPHATE CATALYST AND PREPARATION THEREOF

Edgar C. Britton and Andrew J. Dietzler, Midland, Mich., assignors to The Dow Chemical Company, Midland, Mich., a corporation of Delaware No Drawing. Original application April 3, 1944, Serial No. 529,404, now Patent No. 2,442,319, dated May 25, 1948. Divided and this application January 6, 1947, Serial No. 720,488

13 Claims. (Cl. 252—228.2)

This invention concerns an improved process and a new catalyst for the dehydrogenation of olefines having more than three carbon atoms in the unsaturated carbon chain of the molecule. It pertains especially to the dehydrogenation of olefines having only four carbon atoms in the unsaturated carbon chain to form corresponding conjugated diolefines, and more particularly to the dehydrogenation of n-butenes to form butadiene-1.3

It is, of course, well known that aliphatic hydrocarbons, e. g. petroleum fractions or individual paraffins or olefines, may be pyrolyzed to obtain a mixture of products comprising a small, though appreciable, proportion of conjugated diolefines. During such pyrolysis, two or more different kinds of reactions, e. g. dehydrogenation, cracking of the carbon-to-carbon linkages in the molecule to form products containing fewer carbon atoms than in the original hydrocarbon, and polymerization of unsaturated hydrocarbons, usually occur simultaneously so that the product is, in most instances, a hydrocarbon mixture. Cracked-oil gas, containing paraffinic hydrocarbons ranging from methane to hexane, olefines ranging from ethylene to hexylene, and a small amount, usually less than 10 per cent, of less saturated hydrocarbons such as butadiene, isoprene, piperylene and acetylenic hydrocarbons, etc., is an example of such usual diolefine-containing product. The difficulties involved in recovering a pure diolefine from such mixture add greatly to its cost.

A number of special catalytic methods have been proposed, whereby an olefine may be dehydrogenated to form a corresponding diolefine in higher concentration than in cracked-oil gas, but even in these instances the yield and concentration of the diolefine are undesirably low. For instance, United States Patent 2,178,601 discloses a method and certain dehydrogenation catalyst for the production of diolefines from corresponding olefines. The patent indicates that, under the optimum conditions disclosed, n-butylenes may be pyrolyzed to produce butadiene-1.3 in a concentration of 34 per cent, based on the weight of the condensed products, and in a yield of 19 per cent, based on the butylenes employed, or of about 30 per cent, based on the butylenes consumed. The dehydrogenation of amylenes is shown to occur more favorably with formation of isoprene in somewhat higher yields, e. g. in a yield of 22 per cent based on the amylene employed in a single pass.

It is an object of this invention to provide an improved method for the dehydrogenation of olefines having in the molecule at least four carbon atoms in a chain containing the olefinic linkage. A particular object is to provide such a method whereby the yield and concentration of butadiene-1.3, or of isoprene, from the pyrolysis of a corresponding olefine may be improved. Another object is to provide a new substance which is unusually effective as a catalyst for the dehydrogenation of olefines having at least four carbon atoms in a chain containing the olefinic group. A further object is to provide a set of operating conditions under which the new catalyst may effectively be used for the foregoing purposes. Other objects will be apparent from the following description of the invention.

We have found that calcium nickel phosphate containing an average of between 7.5 and 9.2, and preferably from 8.2 to 9, atoms of calcium per atom of nickel is, under certain operating conditions, far more effective than any other substance known to us in catalyzing the thermal dehydrogenation of olefines having in the molecule at least four carbon atoms in a chain containing the olefinic linkage. We have further found that the catalyst is particularly effective in promoting the dehydrogenation of olefines having from four to six carbon atoms in the molecule and having only four carbon atoms in the unsaturated chain to form corresponding conjugated diolefines, e. g. butadiene-1.3, or isoprene. When properly prepared and employed, the catalyst is quite rugged, long-lived, and permits considerable latitude in the operating conditions which may be used in effecting a dehydrogenation reaction. However, there are certain critical limitations as to the composition of the catalyst and the conditions under which it may satisfactorily be used.

The catalyst is not a heterogeneous mixture of calcium phosphate and nickel phosphate; such mixture is relatively ineffectual particularly as a catalyst for the dehydrogenation of an olefine to form a diolefine. It appears that, in order to be effective as a catalyst for such purpose, there must not only be a quite definite ratio of calcium atoms to nickel atoms, but that the spatial relationship between the calcium atoms and the nickel atoms must be a fixed and definite one. Whether the catalyst is a single chemical compound, or is a mixture of tricalcium phosphate and a calcium nickel phosphate, or of tricalcium phosphate and nickel phosphate itself, having the different kinds of molecules in a definite arrangement within a single crystal lattice, has not definitely been determined. It is our belief that the catalyst is a solid solution of tricalcium phosphate and calcium nickel phosphate in definite proportions and in a fixed spatial relationship, such as exists within a single crystal lattice, but the invention is not limited by this theory as to the structure of the catalyst.

The catalyst is preferably prepared by adding a solution of calcium and nickel salts (containing from 7.5 to 9.2 and preferably from 8.2 to 9.0 atoms of calcium per atom of nickel) to a solution of a soluble phosphate while maintaining the resultant mixture in a neutral or preferably alkaline condition. Alternatively, the catalyst may be prepared by adding an aqueous solution of phosphoric acid and the calcium and nickel salts to an aqueous solution of an alkali, preferably ammonia. Although the ratio of calcium to nickel ions in the mixture under treatment is of great importance, the porportion of phosphate ions, relative to the calcium and nickel ions, may be varied widely. Usually, the phosphoric acid or soluble phosphate is used in slight excess over the amount theoretically required to react with the calcium and nickle ions to form a normal salt, but it may be used in the proportion theoretically required to form such salt, or in a smaller or considerably greater proportion. In any instance, calcium nickel phosphate is formed and precipitated as an approximately normal salt of the phosphoric acid.

It is important that the precipitation be carried to completion under neutral or alkaline conditions, since the precipitate which is formed when the reaction mixture becomes acidic, i. e. of pH value below 7 possesses inferior properties as a catalyst. Uusually the precipitation is carried out under moderately alkaline conditions, e. g. such that the mixture is of pH between 8 and 12, but it may be accomplished under neutral or more strongly alkaline conditions. Examples of nickel and calcium salts which may be used as starting materials in preparing the catalyst are the chlorides, nitrates, and acetates, etc., of these metals. Examples of soluble phosphates that may be employed as starting materials are disodium phosphate, trisodium phosphate, dipotassium phosphate, di-ammonium phosphate, etc. The catalyst products have proven to be particularly active when prepared by precipitation from an alkaline mixture containing an ionizable basic nitrogen compound, e. g. ammonia, a water-soluble ammonium salt, or a water-soluble amine or amine salt such as diethylamine, triethylamine, or diethanolamine, etc., but the presence of such basic nitrogen compound is not required. It is thought that such basic nitrogen compound forms an intermediate water-soluble addition compound with the soluble nickel salt used as a starting material and that such addition compound reacts gradually with the other starting materials to form and precipitate calcium nickel phosphate of somewhat greater uniformity than is obtained in the absence of the basic nitrogen compound. However, the invention is not restricted by this theory as to the function of the basic nitrogen compound.

In practice, an aqueous solution of the chlorides of calcium and nickel in the relative proportions just stated is added with stirring to an aqueous solution of di- and/or tri-ammonium phosphate, since when employing these particular starting materials, the precipitation may be carried to completion under alkaline conditions. When using certain of the other starting materials just mentioned, the mixture tends to become acidic during precipitation of the product, and an alkali, e. g. ammonia or sodium hydroxide, etc., must be added in order to maintain an alkaline condition. Usually water is employed as the solvent for the starting materials, but other ionizing solvents, e. g. aqueous alcohol, may in some instances be used.

The precipitate is separated from the liquor and is washed with water. The washing should be carried out so as to remove as thoroughly as possible readily soluble nickel compounds and any chlorides from the product, since such nickel-containing impurities have a catalytic action on the thermal decomposition of hydrocarbons other than that of the desired catalyst and since chlorides, if retained in the catalyst, tend to deactivate the latter. We have observed that the final portions of the wash liquor almost invariably are of a pH value between 7.8 and 8.2, and the property of giving water in intimate contact therewith such pH value appears to be a characteristic of the freshly formed catalyst. The catalyst is, at this stage in its preparation, a solid gel-like substance which does not give a crystalline X-ray diffraction pattern and, therefore, is apparently amorphous.

After being washed with water, the product is dried, usually at temperatures between 60° and 150° C. The dried product is a hard gel usually of yellowish color. The gel may be crushed or otherwise reduced to granules, or small lumps, and be used directly as a dehydrogenation catalyst. However, it is preferably pulverized, e. g. to a particle size capable of passing a 28-mesh screen, and the powdered product is treated with a lubricant and is pressed into the form of pills, tablets, or granules of size suitable for use as a catalyst, e. g. into the form of tablets of from $\frac{1}{8}$ to $\frac{1}{2}$ inch diameter. The lubricant serves to lubricate the particles during the operation of pressing them into pills and its use permits the formation of pills of greater strength and durability than are otherwise obtained. As the lubricant we preferably use a substance capable of being removed by vaporization or oxidation from the product, e. g. a substance such as graphite, a vegetable oil, or a hydrocarbon oil, etc.

Although it is important in preparing the catalytic substance by the above-described precipitation method that the soluble calcium and nickel compounds be employed in amounts corresponding to a ratio of between 7.5 and 9.2 calcium atoms per atom of nickel, since otherwise the product is less effective for its intended purpose, after having prepared the catalyst in gel form, it may be pulverised and blended with relatively inert and catalytically inactive substances such as diatomaceous earth or normal calcium phosphate, etc., without losing its catalytic activity. These facts support our belief that the new catalyst contains the calcium and nickel atoms in a definite spatial relationship. Accordingly, although the catalyst may not be a single compound, it is nevertheless a definite substance having a set of properties which characterize it, and its ingredients are evidently in solid solution, or in chemical combination, with one another.

The catalyst is, in some instances, highly selective when used as a dehydrogenation catalyst, and there are certain limitations as to the olefines which may satisfactorily be dehydrogenated with the catalyst and as to the reaction conditions to be employed. These limitations are that the olefine reactant should have in the molecule at least four carbon atoms in a chain containing the olefinic linkage and that the dehydrogenation reaction be carried out in the presence of steam. It is also important that the reaction be carried out at temperatures between 600° and 750° C. or at temperatures not greatly outside this range. The catalyst is unusually effective when used under suitable conditions for the dehydrogenation of olefines having four or more carbon atoms in the chain containing the olefinic linkage. However, the kind of product formed by the dehydrogenation reaction varies somewhat depending upon the particular olefine subjected to the treatment. Olefines having only four carbon atoms in the chain containing the unsaturated linkage are readily dehydrogenated by means of the catalyst to form corresponding conjugated diolefines in exceptionally high yields and high concentrations. The invention is particularly concerned with the dehydrogenation of such olefines. Olefines having more than four carbon atoms in the chain containing the unsaturated linkage may be cyclized during treatment with the catalyst. For instance, the dehydrogenation of hexene-1 may be carried out to produce benzene. The catalyst does not appear to be effective in catalyzing the dehydrogenation of olefines having less than four carbon atoms in the chain of the molecule containing the olefinic linkage, i. e. it is not highly effective in catalyzing the dehydrogenation of ethylene, propylene, or isobutylene. Accordingly, the catalyst may be employed to effect the selective dehydrogenation of certain olefines in the presence of other olefines. For instance, a mixture of isobutylene and a normal butylene may be passed over the catalyst to cause dehydrogenation of the normal butylene with formation of butadiene-1.3 in good yield and leave the isobutylene largely unreacted.

However, the catalyst is highly active in causing the dehydrogenation of olefines only when used in the presence of steam. The latter appears to promote, or activate, the catalyst, presumably by forming a hydrate of the same. It may be that the steam also prevents rapid fouling of the catalyst by removing tarry or carbonaceous materials therefrom. Although olefines having at least four carbon atoms in the unsaturated chain of the molecule may be dehydrogenated in the presence of steam and the catalyst at temperatures between 600° and 750° C., and in some instances at temperatures as much as 50° C. below or above this range, the reaction is advantageously carried out at temperatures between 650° and 700° C.

Except for the foregoing limitations, the conditions under which the dehydrogenation reaction is carried out may be varied widely. For instance, the method is operable at widely varying rates of vapor flow, although the rate of flow should, of course, be sufficient to avoid excessive decomposition of the dehydrogenated hydrocarbon product. Also, the method is operable at atmospheric, subatmospheric, or at superatmospheric pressures, provided the olefine reactant is in vaporized form. In some instances, the yield of dehydrogenated product decreases upon increase of the reaction pressure above atmospheric. However, the ability to operate at an increased pressure is of considerable advantage, since condensation of the reaction products may thereby be facilitated. In general, the proportion of the olefine reacted and also the amount of by-product formation per pass through the catalyst bed tend to decrease with increase in the rate of vapor flow, and vice versa.

In producing a diolefine in accordance with the invention, a reaction chamber is charged with the granular catalyst and the lubricant is removed from the catalyst by passing air, or preferably a mixture of about equal volumes of air and steam, through the catalyst bed at a high temperature, e. g. 450° to 750° C. When the lubricant used in preparing the catalyst granules is a substance capable of being vaporized, e. g. a mineral or vegetable oil, the step of treating the catalyst with air may be preceded by one of passing an inert gas such as nitrogen or carbon dioxide over the catalyst so as to vaporize at least a portion of the binding agent from the catalyst granules. We have noted that during such heating operations to remove the lubricant, the catalyst changes somewhat in character, i. e. it changes, at least in part, from its initial state of being an amorphous solid gel which fails to give a crystalline X-ray diffraction pattern into a state in which it does give an X-ray diffraction pattern. However, the crystals formed are so minute that they cannot ordinarily be seen, even with a microscope, and the crystallization which occurs during heating of the catalyst is not apparent to the eye.

After freeing the catalyst of the lubricant, the catalyst bed is swept free of air with steam and is heated to the desired reaction temperature, preferably by passing superheated steam through the same. A mixture of steam and the olefine reactant, e. g. butylene, amylene, or a hexylene having at least four carbon atoms in the unsaturated carbon chain, is then passed through the catalyst bed at a temperature between 600° and 750° C., and preferably between 650° and 700° C. The usual procedure is to pass the olefine-containing gas into admixture with steam which has been superheated to 750° C. or above, i. e. to a temperature sufficient so that the resultant mixture is at the desired reaction temperature, and to pass the mixture through the bed of catalyst. However, the heat may be supplied in other ways, e. g. by forming the steam and hydrocarbon mixture at a lower temperature and passing the mixture through a preheater to bring it to the desired temperature, or by externally heating the catalyst chamber itself. The yield of diolefine is usually highest when from 10 to 20 volumes of steam are employed per volume of the olefine-containing hydrocarbon, but the steam may be used in smaller or larger proportions if desired. As hereinbefore mentioned, the rate of vapor flow through the catalyst chamber may be varied widely, but in practice the flow usually corresponds to between 100 and 700 liters of the olefine (expressed as at 0° C. and 760 millimeters pressure) per liter of catalyst bed per hour.

The vapors issuing from the catalyst chamber are ordinarily passed through heat exchangers and other cooling devices to condense first the water and then the hydrocarbon products. The concentration of diolefine in the latter is dependent in part upon the concentration of the olefine reactant in the hydrocarbon starting material and cannot definitely be stated. However, when treating n-butylenes as just described, we have obtained, in a single pass, consumption of from 45 to 60 per cent of the butylene with formation of a hydrocarbon condensate containing from 35 to 45 per cent by weight of butadiene. The diolefine product may be separated from the other hydrocarbons in any of the usual ways, e. g. by reaction with sulphur dioxide or cuprous chloride to form a double compound, and the unreacted olefine may be recycled in the process. By repeatedly recycling the unreacted olefine, a diolefine may be produced in a 60 per cent yield or higher and usually in a yield of from 70 to 75 per cent of theoretical or higher.

During use in the process, the catalyst gradually accumulates a small amount of carbon, or non-violatile organic material, and loses its activity. Accordingly, flow of the hydrocarbon starting material is periodically interrupted and air, admixed with the steam, is blown through the catalyst bed, e. g. at temperatures between 450° and 700° C., and preferably at the dehydrogenating temperature, to oxidize and remove the carbonaceous or organic material and thus reactivate the catalyst. Usually from 10 to 30 minutes is required to carry out this reactivation step. However, if, during compounding of the catalyst into tablet form, an agent having the property of catalyzing the oxidation of carbon is admixed therewith, the time subsequently required for reactivating the catalyst with steam and air may be reduced markedly. For instance, the incorporation of one or two per cent of chromic oxide in the catalyst tablets facilitates reactivation of the catalyst. Other agents having the property of catalyzing the burning of carbon are known to the art.

After completing the reactivation step, the catalyst chamber is again swept free of air with steam and the introduction of an olefine, together with the steam, is resumed. Usually, reactivation of a catalyst is advisable after from 30 to 60 minutes of use in the dehydrogenation reaction. In practice, two or more catalyst chambers are employed in a system provided with connections for passing the reaction mixture alternately through different catalyst beds. One catalyst bed is employed in the dehydrogenation reaction, while another is being reactivated. By operating in this manner, the dehydrogenation reaction may be carried out continuously.

The catalyst is long-lived and is not readily poisoned by carbon dioxide, nitrogen, ammonia, steam, relatively non-reactive hydrocarbon diluents such as propane, butane, ethylene, propylene or isobutylene, etc., or by the small amount of sulphur compounds normally present in the olefinic reactants. It is susceptible to poisoning by halogens or halides and may possibly be poisoned by sulphur compounds different from, or are in amounts greater than, those usually present as impurities in the olefines obtained by the pyrolysis of petroleum fractions. The full active life of the catalyst has not as yet been determined. However, during an experiment wherein butylene was dehydrogenated in contact with the catalyst in the intermittent manner just described, i. e. by passing butylene together with the steam over the heated catalyst for a period of time and then interrupting the flow of butylene and reactivating the catalyst by means of air, it was noted that the condensed hydrocarbon products initially contained 43 per cent by weight of butadiene-1.3. After operating in such intermittent manner for a period of 510 hours (during which period the total time for the passage of butylene over the catalyst was 271 hours) the hydrocarbons being collected in the condensate contained 32 per cent by weight of butadiene-1.3. These tests indicate that the activity of the catalyst decreases very gradually during use.

When, after extensive use or because of poisoning, the catalyst has lost much of its activity, it need not be discarded. We have found that such de-activated catalyst may be "remade" by dissolving the same in an aqueous solution of a strong mineral acid, e. g. hydrochloric or nitric acid, to form a solution of the corresponding calcium and nickel salts and free phosphoric acid. This solution is filtered, if necessary, to remove any undissolved solid impurities, after which it is added slowly and with stirring to an aqueous alkali solution, preferably an aqueous solution of ammonia or a soluble amine in amount sufficient to maintain the resultant mixture in alkaline condition. During such mixing operation the calcium nickel phosphate catalyst is formed and precipitated as a gel. The latter is separated, washed with water, dried, crushed or ground, mixed with a lubricant and pressed into pellets as hereinbefore described. The catalyst product thus "remade" is usually as active as when originally prepared. Such operations for remaking the catalyst may be resorted to in case of an error in the original preparation of the catalyst.

The following examples describe certain ways in which the principle of the invention has been applied, but are not to be construed as limiting the invention.

EXAMPLE 1

Approximately 20.9 pounds of a dilute aqueous ammonia solution (containing 372 grams, or 21.9 gram moles, of $NH_3$) was added with stirring to approximately 200 pounds of a dilute aqueous solution of ortho-phosphoric acid, which latter solution contained 665 grams, or 6.78 gram moles, of $H_3PO_4$. To the resultant ammonium phosphate solution, approximately 82.8 pounds of an aqueous solution of 986 grams (8.88 gram moles) of calcium chloride and 245 grams (1.02 gram moles) of nickel chloride, i. e. $NiCl_2 \cdot 6H_2O$, was added with stirring at temperatures between 25° and 30° C. over a period of two hours. During this treatment, the mixture became flocculent due to the formation of insoluble calcium nickel phosphate. After adding the ingredients, stirring was continued for one-half hour. The mixture was then allowed to stand for about six hours, during which period the calcium nickel phosphate settled as a distinct lower layer. The supernatant liquor was removed by decantation, and the residue was washed repeatedly with water until the final washings were substantially free of soluble nickel compounds and chlorides. The remaining mixture of water and calcium nickel phosphate was filtered, whereby the calcium nickel phosphate was obtained in the form of a gelatinous filter cake. The latter was dried by heating the same at 60° C. for 12 hours and thereafter at 130° C. for 24 hours. The product, which was a hard yellow gel, was ground to a particle size capable of passing a 28 mesh screen. The powdered product was mixed with approximately 10 per cent by weight by Sterotex (a hydrogenated vegetable oil) and was pressed into the form of tablets of ⅛ inch thickness and ¼ inch diameter. These tablets were again ground to less than 28 mesh particle size, and the powder was pressed into the form of tablets of ⅛ inch thickness and ⅛ inch diameter. The Sterotex was removed by passing a mixture of air and steam through a bed of the tablets at temperatures of from 350° to 650° C. The tablets then had a bulk density of approximately 1, i. e. 100 cubic centimeters of the pills weighed 100 grams. The product is an excellent catalyst for the thermal dehydrogenation of olefines having at least four carbon atoms in an unsaturated chain of the molecule.

EXAMPLE 2

A hydrocarbon gas consisting of approximately 89 per cent by volume butylene-1, 8 per cent butylene-2, 2 per cent lower hydrocarbons, and 1 per cent of butadiene was passed in continuous flow into admixture with approximately 18.8 parts by volume of steam (all volumes being expressed as at 0° C. and 760 millimeters pressure). The resultant mixture was passed through a chamber containing 150 cubic centimeters of the catalyst product described in Example 1, in the form of a bed of 13 inches depth. The "space velocity," i. e. the rate of flow of the vapors through the chamber in terms of liters of hydrocarbons in the vapor mixture (as at 0° C. and 760 millimeters pressure) per liter of the catalyst bed per hour, was 319. During flow of the vapor mixture through the catalyst chamber the latter was heated at a wall temperature of about 650° C. The vapors flowing from the chamber were cooled, first sufficiently to condense the steam, and thereafter to about −80° C. to condense the hydrocarbon products. The uncondensed gas consisted largely of hydrogen, lower hydrocarbons such as methane, ethane and ethylene and gaseous impurities such as the oxides of carbon. The hydrocarbon condensate was found to contain approximately 35 per cent by weight of butadiene-1.3 and 56 per cent of unreacted butylene. Approximately 47 per cent of the n-butylenes were consumed in a single pass. The yield of butadiene in a single pass was approximately 33 per cent of theoretical, based on the butylenes employed, or 70 per cent based on the butylenes consumed in the reaction.

EXAMPLE 3

Steam was passed in continuous flow through a heater, where it was superheated to 750° C. and thence into admixture with a hydrocarbon gas containing 97 per cent by volume of n-butylenes, i. e. a gas having the composition stated in Example 2. The relative rates of flow of the steam and the hydrocarbon gas were such as to form a vapor mixture having a temperature of about 705° C. and containing approximately 20 parts by volume of steam per part of the hydrocarbons. The vapor mixture flowed immediately from the zone of mixing into a bed of the catalyst, prepared as described in Example 1, at a rate corresponding to a space velocity of 294. The catalyst bed was insulated against heat losses and was heated only by the vapors passing through the same. The temperature was 705° C. at the point where the vapors flowed into the bed and was 655° C. where the vapors flowed from the bed. Vapors issuing from the bed of catalyst were cooled in stages, first to condense the water vapor and then to condense the hydrocarbons having four carbon atoms in the molecule. The hydrocarbon condensate corresponded in weight to 90.8 per cent of the butylenes in the starting materials. The hydrocarbon condensate contained 44 per cent by weight of butadiene and approximately 44.7 per cent of unreacted butylenes. The yield of butadiene from the single pass through the bed of catalyst was approximately 40 per cent of theoretical, based on the butylenes in the starting materials or 72 per cent, based on the butylenes consumed.

EXAMPLE 4

The catalyst in tablet form, prepared as described in Example 1, was employed in each of two experiments for purpose of determining the effect of pressure changes on the course or extent of the catalytic reaction. The procedure in carrying out each experiment was to admix vapors of a cracked-oil gas fraction, containing 97 per cent by volume of normal butylenes, with about 19–21 parts by volume of steam and pass the mixture through a bed of the catalyst at the space velocity indicated in the following table, while heating the catalyst bed at a mean temperature of about 650° C. Vapors flowing from the bed were cooled in stages to condense first the water and thereafter the hydrocarbons having four carbon atoms in the molecule. The hydrocarbon condensate was weighed and analyzed. The experiments differed principally as regards the vapor pressure on the reaction system, i. e. one of the experiments was carried out at approximately atmospheric pressure, whereas the other experiment was carried out at a vapor pressure, in the reaction zone, of three atmospheres, absolute. The following table states the pressure at which each dehydrogenation reaction was carried out, gives the rate of flow of vapors into the catalyst bed in terms of space velocity, i. e. in terms of liters of hydrocarbons in the gas under standard conditions per liter of catalyst per hour; states the weight of the hydrocarbon condensate as per cent of the weight of the butylenes in the starting mixture; and gives the per cent by weight of butadiene in the hydrocarbon condensate. It also gives the per cent yield of butadiene on the butylenes in the starting mixture.

TABLE

| Run No. | Reaction Pressure Atmospheres | Space Velocity | HC Condensate per cent Wt. of $C_4H_8$ Employed | Per cent of $C_4H_6$ in Condensate | Per cent Yield |
|---|---|---|---|---|---|
| 1 | 1 | 317 | 91.6 | 28.0 | 26.6 |
| 2 | 3 | 280 | 87.7 | 30.8 | 28.0 |

EXAMPLE 5

A vapor mixture of 359 grams of steam and 69 grams of a fraction of cracked-oil gas, consisting for the most part of aliphatic hydrocarbons containing five carbon atoms in the molecule and containing 94 per cent by weight of amylenes (principally 2-methyl-butene-1 and 2-methyl-butene-2) was passed at a constant rate of flow and in a period of 30 minutes through a bed of 125 cubic centimeters of calcium nickel phosphate tablets at temperatures between 637° and 651° C. The calcium nickel phosphate was a normal salt which contained approximately 8.2 atoms of calcium per atom of nickel. It was prepared and compounded into tablets as described in Example 1. The vapors flowing from the bed of calcium nickel phosphate were cooled in stages to condense first the steam and thereafter the hydrocarbons containing at least four carbon atoms in the molecule. There were obtained 64.6 grams of condensed hydrocarbons and 12.2 liters (calculated as at 0° C. and 760 millimeters pressure) of non-condensed gaseous products. The hydrocarbon condensate was fractionally distilled and 61.3 grams of a fraction distilling at temperatures between 21° and 37° C. at atmospheric pressure was collected. This fraction was found to contain approximately 36.3 per cent by weight of isoprene, 55.7 per cent of amylenes and 8 per cent of pentanes. The yield of isoprene was approximately 35.3 per cent of theoretical, based on the amylenes in the starting materials, or 74.5 per cent, based on the amylenes consumed in the reaction.

EXAMPLE 6

The purpose of this example is to illustrate the remaking of a catalyst which, due apparently to an error in the original preparation of the same, did not possess as great an activity as is normal for a catalyst of its composition. The catalyst to be remade was a normal calcium nickel phosphate containing 8.2 atoms of calcium per atom of nickel. When a mixture of one part by volume of normal butylene and 20 parts of steam was passed at a space velocity of 300 over this catalyst heated to a temperature of 650° C. and the vapors flowing from the catalyst bed were cooled under pressure to condense the hydrocarbon products having at least four carbon atoms in the molecule, a condensate was obtained which contained only 35 per cent by weight of butadiene. 290 grams of this catalyst of sub-normal activity was dissolved in 1000 grams of an aqueous hydrochloric acid solution of approximately 18 per cent concentration. The mixture was heated overnight on a steam bath and thereafter was boiled for a period of 2 hours in order to dissolve the catalyst as completely as possible. It was noted that the resultant solution contained a small amount of carbon and the solution was filtered to remove the carbon. The filtrate was diluted with 12 liters of distilled water. The resultant solution was added with stirring at 25° C. and over a period of 2 hours to a solution of 91.6 grams of ammonia in 30.26 kilograms of water. During the addition, calcium nickel phosphate was formed and precipitated. The mixture was allowed to stand so as to permit settling of the product, after which the latter was removed by filtration, washed thoroughly with water and dried. The gel thus obtained was pulverized, admixed with 10 per cent by weight of a lubricant, and pressed into tablets, as described in Example 1. The catalyst thus prepared was tested by first passing steam and air over the same at an elevated temperature to remove the lubricant and thereafter passing a mixture of 1 part by volume of normal butylene and 20 parts of steam at a space velocity of 300 through a bed of the catalyst while heating the latter at 650° C. The vapors issuing from the catalyst bed were cooled to condense the hydrocarbons having at least four carbon atoms in the molecule. The condensate was found to contain 48 per cent by weight of butadiene. The weight of the condensate corresponded to approximately 87 per cent of the weight of the butylene employed in the treatment.

This application is a division of my copending application, Serial No. 529,404, filed April 3, 1944, now U. S. Patent No. 2,442,319, issued May 25, 1948.

Other modes of applying the principle of the invention may be employed instead of those explained, change being made as regards the method or product herein disclosed, provided the steps or compounds stated by any of the following claims or the equivalent of such stated steps or compounds be employed.

We therefore particularly point out and distinctly claim as our invention:

1. A normal metal phosphate material prepared by precipitation from a non-acidic solution of a calcium salt, a nickel salt, and a phosphate, which normal metal phosphate material contains between 7.5 and 9.2 atoms of calcium per atom of nickel, separating the precipitate, washing it with water, and drying it.

2. A normal metal phosphate material consisting essentially of phosphate ions chemically combined with calcium and nickel in the relative proportions of from 8.2 to 9 atoms of calcium per atom of nickel and formed by precipitation from a non-acidic solution of a calcium salt, a nickel salt, and an ortho-phosphate, separating the precipitate, washing it with water, and drying it.

3. A normal metal phosphate material in the form of a gel consisting essentially of phosphate radicals chemically combined with calcium and nickel in the relative proportions of from 7.5 to 9.2 atoms of calcium per atom of nickel, which gel is formed by mixing an aqueous solution of a soluble calcium salt and a soluble nickel salt with an aqueous solution of an ortho-phosphate under at least slightly alkaline conditions, separating the product which precipitates from the mixture, washing it with water, and drying it.

4. The product of claim 3 when pulverized and thereafter pressed into pellets.

5. The product of claim 3 when pulverized, mixed with an oxidizable lubricant, and pressed into the form of pellets.

6. Pellets of a normal metal phosphate material consisting essentially of phosphate radicals chemically combined with calcium and nickel in the relative proportions of from 7.5 to 9.2 atoms of calcium per atom of nickel and prepared by precipitation under non-acidic conditions from an aqueous mixture of a dissolved calcium salt, a dissolved nickel salt, and a dissolved ortho-phosphate, washing and drying the resultant precipitate of normal metal phosphate material to obtain the latter in the form of a gel, pulverizing the gel, treating it with an oxidizable lubricant, pressing the mixture into the form of pellets, and removing the lubricant.

7. The method of making a dehydrogenation catalyst which comprises mixing an aqueous solution of a soluble calcium salt and a soluble nickel salt, in proportions corresponding to between 7.5 and 9.2 atoms of calcium per atom of nickel, with an aqueous solution of a soluble ortho-phosphate while maintaining the resultant mixture at least slightly alkaline, whereby a normal metal phosphate material consisting essentially of phosphate radicals chemically combined with calcium and nickel is formed and precipitated, and separating and drying the precipitate.

8. The method of making a catalyst for the thermal dehydrogenation of an olefine to form a corresponding conjugated diolefine, which comprises mixing an aqueous solution of calcium chloride and nickel chloride in proportions corresponding to between 8.2 and 9 atoms of calcium per atom of nickel, with an aqueous solution of an ammonium ortho-phosphate containing sufficient ammonium ions to maintain the mixture in non-acidic condition and containing phosphate ions in amount corresponding approximately with that theoretically required to react with the calcium and nickel salts and form normal calcium and nickel ortho-phosphates, whereby a corresponding metal phosphate material is formed and precipitated, separating the metal phosphate material, washing it substantially free of soluble nickel compounds and chlorides with water, drying the metal phosphate material to obtain a gel of the same, pulverizing the gel, treating the powder with an oxidizable lubricant, and pressing the resultant mixture into the form of pellets.

9. The method as described in claim 8, wherein the lubricant is graphite.

10. In a method of making a dehydrogenation catalyst, the steps which consist in forming a non-alkaline aqueous solution of a calcium compound, a nickel compound and an ortho-phosphate, which solution contains between 7.5 and 9.2 atoms of calcium per atom of nickel, and precipitating from the solution a corresponding normal metal phosphate material containing calcium and nickel in the relative proportions just stated.

11. In a method of preparing, from a normal metal phosphate material which consists essentially of phosphate radicals chemically combined with calcium and nickel in the relative proportions of between 7.5 and 9.2 atoms of calcium per atom of nickel, but which is of sub-normal activity as a catalyst for the dehydrogenation of butylene to form butadiene, a normal metal phosphate material of approximately the same chemical composition but of greater activity as a catalyst for such reaction, the steps of dissolving in an aqueous solution of a mineral acid the normal metal phosphate material of sub-normal activity and thereafter precipitating the normal metal phosphate material from the solution by rendering the latter alkaline.

12. In a method of making a dehydrogenation catalyst the steps which consist in forming an aqueous solution of ortho-phosphoric acid, a calcium salt and a nickel salt, which solution contains between 7.5 and 9.2 atoms of calcium per atom of nickel and precipitating a corresponding normal metal phosphate material containing calcium and nickel in the relative proportions just stated by admixing said solution with an aqueous solution of an alkali, the latter being present in amount sufficient to render the resultant mixture non-acidic.

13. The method as described in claim 12, wherein the alkali is ammonia.

EDGAR C. BRITTON.
ANDREW J. DIETZLER.

REFERENCES CITED

The following references are of record in the file of this patent:

UNITED STATES PATENTS

| Number | Name | Date |
|---|---|---|
| 1,215,335 | Bosch et al. | Feb. 13, 1917 |
| 1,813,478 | Andrussow et al. I | July 7, 1931 |
| 1,882,712 | Andrussow et al. II | Oct. 18, 1932 |
| 2,084,511 | Small | June 22, 1937 |